(12) United States Patent
Lutz et al.

(10) Patent No.: US 10,882,652 B2
(45) Date of Patent: Jan. 5, 2021

(54) METHOD FOR PRODUCING PACKAGING BY MEANS OF A PACKING MACHINE

(71) Applicant: ROVEMA GMBH, Fernwald (DE)

(72) Inventors: Erhard Lutz, Muecke (DE); Siegfried Wulsch, Ulrichstein (DE)

(73) Assignee: ROVEMA GMBH, Fernwald (DE)

( * ) Notice: Subject to any disclaimer, the term of this patent is extended or adjusted under 35 U.S.C. 154(b) by 145 days.

(21) Appl. No.: 16/300,620

(22) PCT Filed: Apr. 19, 2017

(86) PCT No.: PCT/EP2017/059224
§ 371 (c)(1),
(2) Date: Nov. 12, 2018

(87) PCT Pub. No.: WO2017/198412
PCT Pub. Date: Nov. 23, 2017

(65) Prior Publication Data
US 2019/0177022 A1 Jun. 13, 2019

(30) Foreign Application Priority Data
May 19, 2016 (DE) .......................... 10 2016 208 670

(51) Int. Cl.
B65B 57/00 (2006.01)
B65B 51/30 (2006.01)
B65B 9/20 (2012.01)

(52) U.S. Cl.
CPC ............... *B65B 57/00* (2013.01); *B65B 9/20* (2013.01); *B65B 51/306* (2013.01); *G05B 2219/45048* (2013.01)

(58) Field of Classification Search
CPC ........ B65B 57/00; B65B 51/30; B65B 51/306; G05B 2219/45048
(Continued)

(56) References Cited

U.S. PATENT DOCUMENTS

| 4,924,657 A * | 5/1990 | Berti et al. ............... B65B 57/00 53/450 |
| 5,706,627 A * | 1/1998 | Kirka et al. ............ B29C 65/08 53/52 |

(Continued)

FOREIGN PATENT DOCUMENTS

| DE | 3814026 A1 | 11/1988 |
| DE | 4037097 A1 * | 5/1992 ............. B65B 57/04 |

(Continued)

*Primary Examiner* — Stephen F. Gerrity
(74) *Attorney, Agent, or Firm* — King & Schickli, PLLC

(57) ABSTRACT

A method for producing packaging, in particular tubular bags, by means of a packaging machine (1) having a PLC control (20). The packaging machine (1) includes several electronic drive units (3, 6) capable of being controlled independently of each other by the PLC control (20) and which can drive the different functional elements (8) of the packaging machine (1) in a manner synchronous to a clock cycle when trailing predefined movement trajectories, and several setting parameters of the production process, in particular the number of objects to be packed per time unit, the packaging dimensions, the sealing times, being predefined, the capturing of the setting parameters at the PLC control (20), which controls the drive units (3, 6) of the packaging machine (1), being followed by the transfer of the setting parameters from the PLC control (20) to a PC control (23).

10 Claims, 3 Drawing Sheets

(58) Field of Classification Search
USPC .......................................................... 53/52
See application file for complete search history.

(56) References Cited

U.S. PATENT DOCUMENTS

| | | | | |
|---|---|---|---|---|
| 5,966,908 | A * | 10/1999 | Philipp et al. | B65B 9/067 53/450 |
| 2005/0016134 | A1 * | 1/2005 | Prebelli et al. | B65B 61/06 53/559 |
| 2006/0236659 | A1 * | 10/2006 | Miyazawa et al. | B29C 66/9392 53/451 |
| 2012/0047849 | A1 * | 3/2012 | Koenigkramer et al. | B65B 9/207 53/416 |
| 2014/0228998 | A1 * | 8/2014 | Jiang | G05B 19/414 700/186 |
| 2015/0019191 | A1 * | 1/2015 | Maturana et al. | G05B 19/0423 703/13 |
| 2015/0225100 | A1 * | 8/2015 | Jelken et al. | B65B 65/003 53/443 |
| 2015/0353214 | A1 * | 12/2015 | Gerstner et al. | B65B 9/045 53/411 |

FOREIGN PATENT DOCUMENTS

| | | | | |
|---|---|---|---|---|
| DE | 19516868 | A1 * | 11/1996 | ............. B65B 57/04 |
| DE | 69517697 | T2 | 10/2000 | |
| DE | 10012579 | A1 * | 9/2001 | ......... G05B 19/0426 |
| DE | 102004049376 | A1 * | 4/2006 | ........... B65B 51/303 |
| DE | 102006012038 | A1 | 9/2007 | |
| DE | 102007024217 | A1 * | 11/2008 | ............. B65B 57/00 |
| DE | 102008024461 | A1 * | 12/2009 | ............. B65B 57/00 |
| DE | 102012004341 | A1 | 9/2013 | |
| EP | 0255474 | B1 * | 7/1992 | ............. B65B 57/04 |
| EP | 0764580 | A1 * | 3/1997 | ............. B65B 57/04 |
| EP | 1431187 | A2 * | 6/2004 | ............. B65B 57/00 |
| EP | 1433708 | A2 | 6/2004 | |
| WO | WO2014023428 | A2 | 2/2014 | |

\* cited by examiner

METHOD FOR PRODUCING PACKAGING BY MEANS OF A PACKING MACHINE

FIELD OF THE INVENTION

The invention relates to a method for producing packaging, in particular tubular bags, by means of a packaging machine.

BACKGROUND OF THE INVENTION

For producing packaging, in particular tubular bags, packaging machines of various embodiments are used across the globe. Packaging machines are used as sophisticated automatized systems having a high productivity. The function of the packaging machines is based on the clock-synchronous embodiment of a plurality of movement trajectories of the different functional elements of the packaging machine in order to be able to carry out the packaging process at a high speed. In a tubular-bag machine, the drives for driving the enveloping material conveyor and the drives for driving the sealing jaws and the drives for driving the bag-cutting device have to be displaced at a high speed in a manner which is clock-synchronous to each other in order to realize a safe method sequence.

The control of known packaging machines controls the different drive units in a clock-synchronous manner and uses predefined movement trajectories. From the state of the art, two generally different machine concepts are known. According to the first machine concept, a conventional PLC control, as used in other industrial fields, in particular in the machine tool industry and in plant engineering, is used for controlling the packaging machine. The usage of such a PLC control has the advantage of the components used therefor being readily available in the respective markets since they cover a very large market. According to the second machine concept, a specifically programmed PC control serves for controlling the packaging machine. This machine concept using a PC control has the advantage of PC controls having a much higher performance with regard to the computational performance and the programmability than the known PLC controls. PC controls can be programmed in particular in high-level programming languages and thus enable a considerably more comfortable and process-safe operation of the packaging machine.

In the previous usage concept of the known packaging machines, the producer and/or the user had to choose either using a PLC control or using a PC control from which the corresponding advantages and disadvantages result. From this, large disadvantages resulted as only PLC controls were in demand in certain markets so that producers of packaging machines comprising PC controls could not distribute their machines in these markets.

SUMMARY OF THE INVENTION

The objective of the present invention is therefore to propose a method for operating a packaging machine which enables using a PLC control and thus upholds the advantages of a PC control.

The method according to the invention is based on the basic notion that a packaging machine comprising a PLC control can be used. The PLC control in particular has the objective of controlling several electronic drive units, which are capable of being controlled independently of each other, in a clock-synchronous manner in such a manner that the functional elements of the packaging machines driven by the drive units are displaced in a clock-synchronous manner when trailing predefined movement trajectories. The predefined movement trajectories are determined in this context as a function of the setting parameters of the production process, such as the number of objects to be packed per time unit, the packaging dimensions, the seal time, etc.

In the first method step, the required setting parameters for determining the desired production process for producing packaging is first captured at the PLC control.

Even before commencing the actual production process, the setting parameters are transferred from the PLC control to a PC control additionally provided in the packaging machine. The additional PC control can be a separate high-performance computer, for example, on which the corresponding operating software for operating a packaging machine is installed.

After transferring the setting parameters, clock-cycle-dependent parameter profile curves are calculated in the PC control for the different drive units of the packaging machine by using the machine software installed on the PC control. In this context, the parameter profile curves are characterized in that they enable the clock-cycle-synchronous control of the different drive units when trailing predefined movement trajectories. In other words, this means that the parameter profile curves define a parameter curve over the clock cycle for each relevant parameter of the packaging machine. Since all parameter curves are based on the clock cycle, a clock-cycle-synchronous control of the different drive units is yielded therefrom. The parameter profile curves are calculated under consideration of the predefined setting parameters of the production process and by factoring in the static and/or dynamic threshold values of the packaging machine.

As soon as the parameter profile curves are calculated in the PC control, they are subsequently separated into a plurality of support points. This means that the parameter profile curve, which is commonly indicated as a mathematical function of the parameter over the clock cycle, is set in individual support points, each support point lying on the parameter profile curve and the sum of all support points representing the parameter profile curve. Each support point itself consists of a specific clock cycle along the work cycle and at least one parameter value allocated to this clock cycle.

After separating the parameter profile curve, the support points derived therefrom are converted to support-point data sets. The support-point data sets can be a corresponding table in whose cells the data of the different support points are input.

Lastly, the support-point data sets are transferred back to the PLC control from the PC control. The advantage of the method according to the invention is that the clock-cycle-dependent parameter profile curves are calculated on a PC control which is available simultaneously to the PLC control present for the control of the packaging machine. By converting the clock-time-dependent parameter profile curves to support-point data sets, it becomes possible to also transfer all essential functionalities, which are known from the PC control, to packaging machines having PLC controls since known PLC controls can easily process such support-point data sets.

When calculating the clock-cycle-dependent parameter profile curves and when subsequently separating them into a plurality of support points, it can happen when using known PC controls that these PC controls calculate a very large number of support points when separating the parameter profile curves. In known PC controls, this can be several thousand support points per parameter profile curve. The forwarding of such a large number of support points in the support-point data bank to the PLC control can cause problems with regard to the running time since the computer performance of the known PLC control does not have such a high performance as the computer performance of the PC control. In order to prevent such running time problems, it is therefore particularly advantageous if the number of the support points which are calculated from the separation of the clock-cycle-dependent parameter profile curves is reduced when generating the support-point data sets. Only the reduced number support points is then adopted into the support-point data sets and forwarded to the PLC control.

In which manner the clock-cycle-dependent parameter profile curves are calculated in the PC control is generally arbitrary. It is particularly advantageous if polynomial functions of a higher power are used for the calculation since particularly smooth and highly dynamic movement trajectories can be realized in this context. A parameter profile curve can be generally calculated in the PC control for each parameter of the packaging machine. The calculation of such parameter profile curves for the clock-cycle-dependent movement profiles, the clock-cycle-dependent speed profiles, the clock-cycle-dependent acceleration profiles, the clock-cycle-dependent power profiles and/or the clock-cycle dependent torque profiles is of particular significance. In other words, this means that for each movement of a functional element of the packaging machine the location, the speed, the acceleration, the torque and/or the power can be predefined for each point in time during a work cycle.

Furthermore, in order to prevent issues with the running time when carrying out the method according to the invention, it is particularly advantageous if the PC control exchanges the setting parameters to be input and the clock-cycle-dependent parameter profile curves to be output with the PLC control via a real-time data bus. Known Ethernet networks are particularly suitable as real-time data busses for this purpose.

In known packaging machines having a PLC control, calculating the setting-specific dynamic threshold values, as known to be conducted from the field of PC control, was not possible as a function of the setting parameters. This calculation of setting-specific dynamic threshold values as a function of the setting parameters input by the user, however, represents a considerable convenience to the users since the input of setting parameter combinations not being capable of being realized via machines is prevented. According to a preferred method variation, it is therefore intended to detect at least one setting-specific dynamic threshold value and to forward it to the PLC control in the PC control every time a setting parameter is changed while considering static threshold values of the packaging machine. Should the dynamic threshold value be outside of the setting range of the respectively used packaging machine, the users then have the chance of acting accordingly and to correct the setting parameters as required.

Saved static threshold values and saved curve tables and/or saved mathematical functions can be preferably processed in order to detect the dynamic threshold values.

Furthermore, it is particularly advantageous if the dynamic threshold values are detected under consideration of at least one dynamic movement trajectory in the packaging machine in a calculation method of the gradual approximation.

In order to be able to realize particularly smooth and highly dynamic movement trajectories in a simple manner, it is moreover particularly advantageous if the clock-cycle-dependent parameter profile curves are carried out in a sophisticated calculation module of the PC control using a calculation software programmed in a high-level programming language.

Which drive units are controlled by the PLC control using the support-point data sets derived from the parameter profile curves in the PC control is generally arbitrary. Of the utmost importance in this context is the control of the control units of a packaging machine, in particular the drive units of enveloping material conveyors, sealing jaws and/or bag-cutting devices. Naturally, any other drive units can also be controlled for all functional units available in the packaging machine by using the support-point data sets.

BRIEF DESCRIPTION OF THE DRAWING FIGURES

An embodiment of the invention is schematically represented in the drawings and is described in an exemplary manner in the following.

In the following,

DETAILED DESCRIPTION OF THE INVENTION

Figure 1:
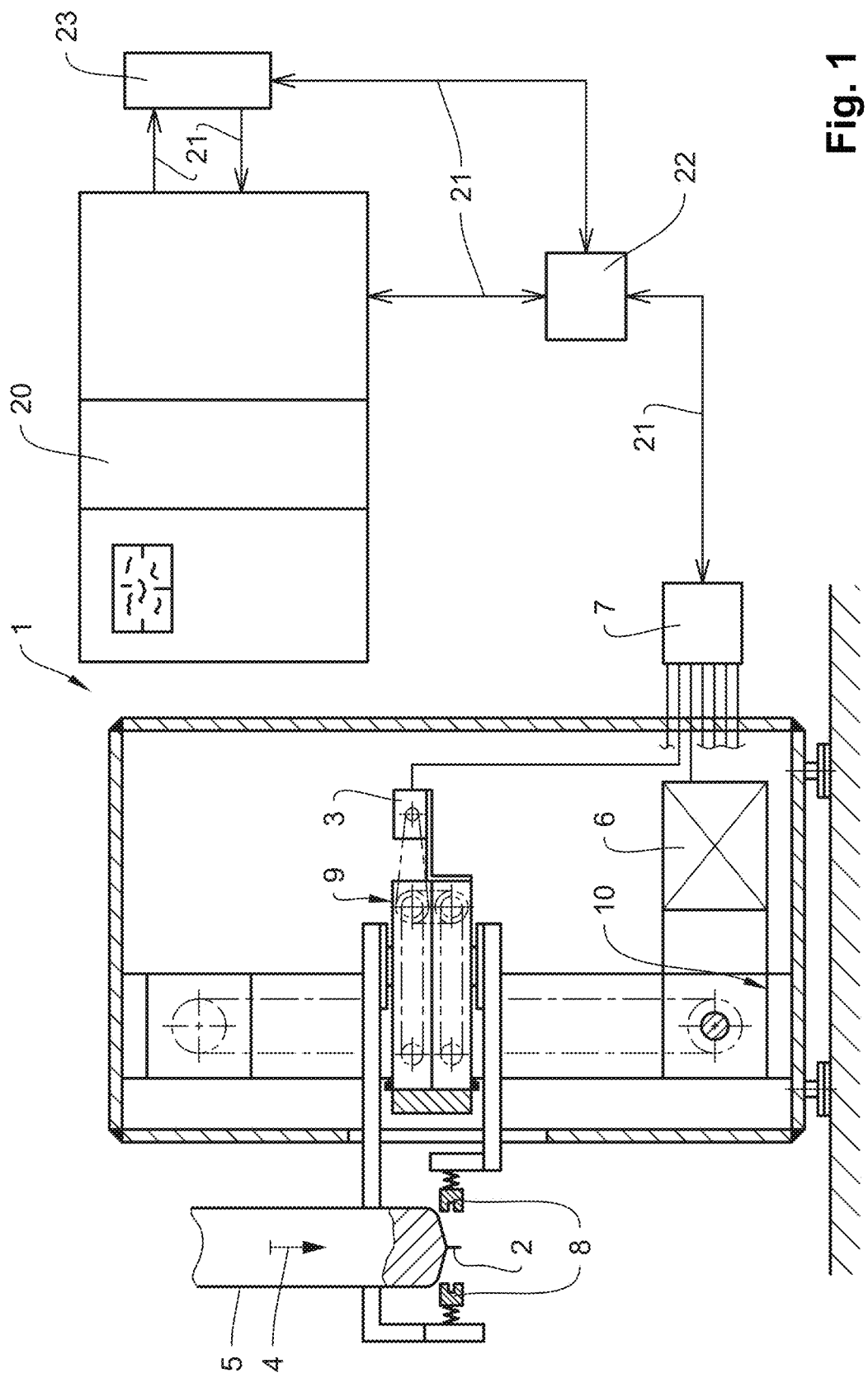
FIG. 1 illustrates from the side a vertical tubular-bag machine having a part of the drives available for driving the functional elements of the tubular-bag machine and a part of the control devices required for controlling the drives.

FIG. 1 illustrates a tubular-bag machine 1 for producing tubular bags. The sealing jaws 8 for sealing the bag cross seam 2 can be displaced vertically to the movement direction 4 of the tube 5 by means of a motor 3 and parallel to the movement direction 4 of the tube 5 by means of a further motor 6. The motors 3 and 6 are controlled independently of each other by a PLC control 20 which communicates with the positioning motors 3 and 6 and also with all other drive units of the packaging machine 1 via an input and output interface 7 and a data bus switch 22 conveyed via a real-time data bus 21.

The sealing jaws 8 are connected in a displaceable manner to a mechanism 10, which can be moved parallel to the movement direction 4 of the tube 5, via a mechanism 9, which can be moved perpendicular to the movement direction 4 of the tube 5. The combination of a tubular-bag machine 1 having a PLC control 20 corresponds to the previously known state of the art.

According to the invention, a PC control 23 is additionally provided which exchanges data with the PLC control via the real-time data bus 21. In this context, the PC control 23 has the task of first reading the setting parameters of the production method of the PLC control 20 and of calculating therefrom parameter profile curves for the operation of the different drive units of the packaging machine 1, in particular for the positioning motors 3 and 6. A short description of the method according to the invention is therefore to follow using an example.

Figure 2:
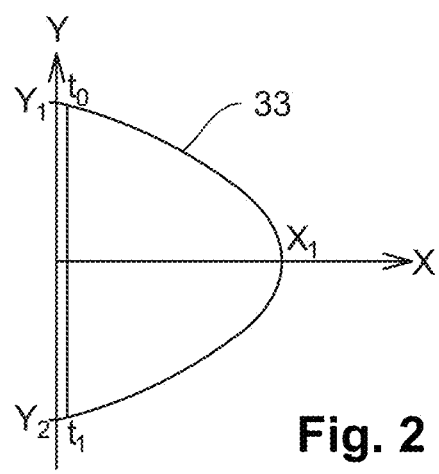
FIG. 2 illustrates an exemplary movement trajectory of the transverse sealing jaws of the tubular-bag machine according to FIG. 1 when producing tubular bag packaging.

FIG. 2 illustrates a known movement trajectory 33, namely a D curve, through which the two transverse sealing jaws 8 must pass through when producing the cross seam on tubular bags. Should the two transverse sealing jaws each be in the middle and be pressed together with the tubular-bag material therebetween, they are first displaced individually in the y-direction. During this purely vertical displacement, the drive force is increased as a function of the method by increasing the drive torque of the drive motor 3 and thus the foil material is sealed. After sufficient sealing, the transverse jaws 8 are moved away from each other horizontally and are displaced vertically towards the top again while horizontally moving the transverse jaws 8 away from each other. After reaching the starting point, the next tubular bag can be sealed in a subsequent work step.

Figure 3:
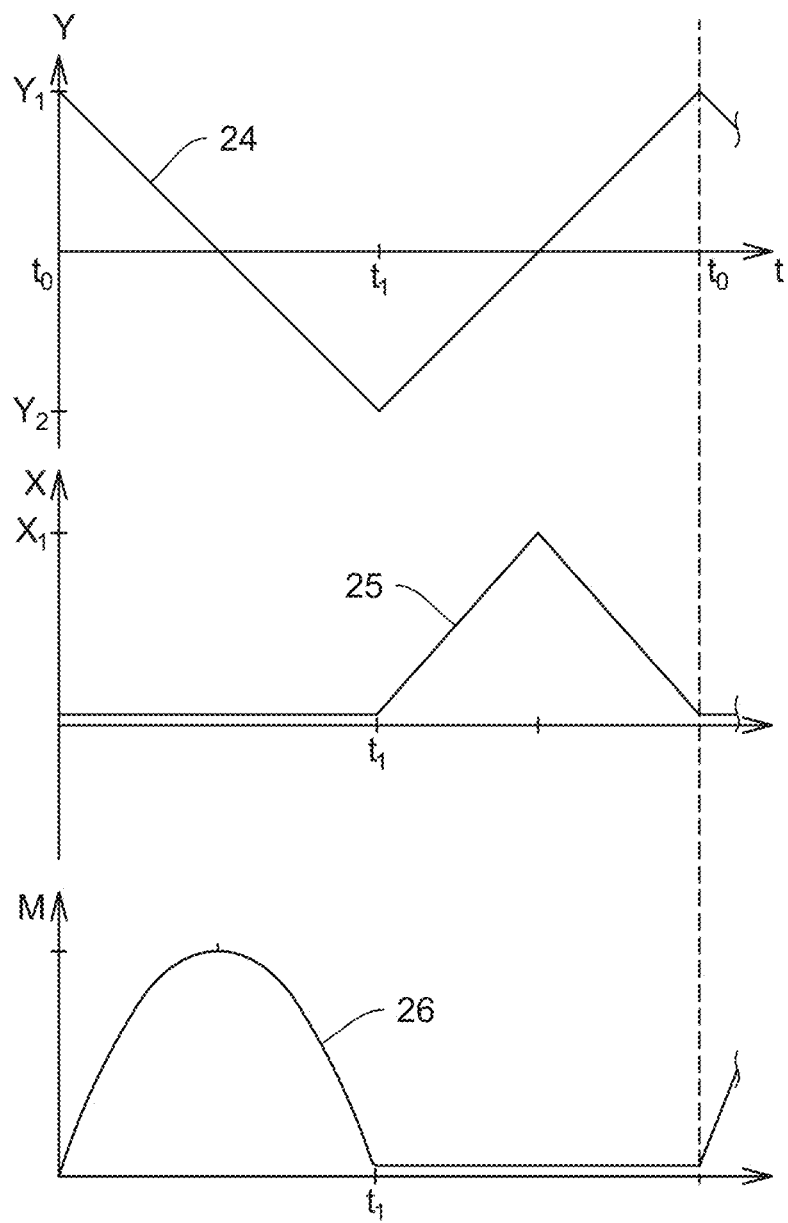
FIG. 3 illustrates three parameter profile curves for controlling the drives of the transverse seal jaws of the tubular-bag machine in a manner synchronous to a clock cycle according to FIG. 1 when trailing the movement trajectory according to FIG. 2.

FIG. 3 illustrates in an exemplary manner three parameter profile curves 24, 25 and 26 for the trailing of the movement of a transverse sealing jaw 8 as illustrated in FIG. 2. In this context, the two upper parameter profile curves 24 and 25 illustrate the clock-cycle-dependent movement profiles in the x-direction or in the y-direction and the lower parameter profile curve 26 illustrates the respective torque profile to be trailed in sync. It can be seen that the drive is alternatingly displaced in the y-direction between the maximal deviations Y1 and Y2 during each clock so as to alternatingly displace the transverse sealing jaws 8 upward and downward. In a manner synchronous to the clock cycle, the x-axis drive of the drive motor 6 is immobilized during the first half of the work cycle in order to effect sealing the tubular bag in this time via the transverse sealing jaws 8 brought into contact with each other. In the second half of the work cycle, the transverse sealing jaws 8 are first moved apart from each other and then brought back together again so that the next tubular bag can be sealed at the end of the work cycle.

The lower-most diagram illustrates the parameter profile curve 26 of the torque of the drive motor 6 during a work cycle. It can be seen that the drive moment of the drive motor 6 rises in the shape of a parabola during the first half of the work cycle, i.e. in the time between t0 and t1, and subsequently drops in the shape of a parabola after exceeding an apex. Owing to this trajectory of the torque in the shape of a parabola, an ideal sealing of the foil sheet becomes possible. In the second half of the work cycle, the torque of the drive motor 6 is close to zero since no significant force has to be transferred to the transverse sealing jaws. The trajectory of the parameter profile curves 24, 25 and 26 is to be understood as being merely exemplary and schematic.

Figure 4:
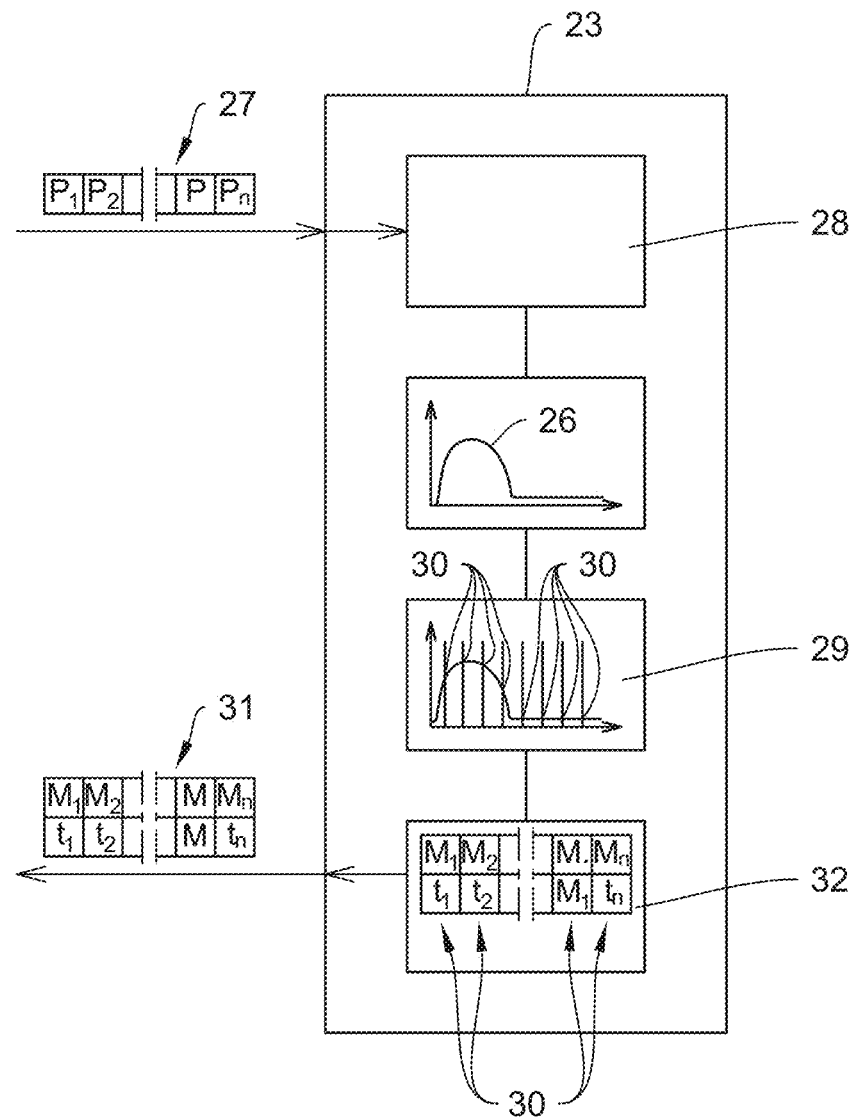
FIG. 4 illustrates in a schematic view the schematic movement trajectory for carrying out the method according to the invention on the control of the packaging machine according to FIG. 1.

FIG. 4 illustrates the PC control 23 when carrying out the method according to the invention in a schematic method overview. First, the setting parameters 27 are read into a sophisticated calculating module 28 by the PLC control 20 via the real-time data bus 21. In the calculating module 28, all parameter profile curves required for operating the desired movement trajectory are calculated from the setting parameters 27 under consideration of the static and the dynamic threshold values of the packaging machine. FIG. 4 additionally illustrates the parameter profile curve 26 as an example.

In a separating module 29, the parameter profile curves 26 are subsequently separated and support points 30 are calculated which represent the parameter profile curves 26 in a digitalized form.

In a generating module 32, the support points 30 are analyzed and the number of the support points 30 is reduced. The thus yielded selection of support points 30 is then used for generating support-point data sets 31. Ultimately, the support-point data sets 31 are transferred back to the PLC control 20 via the real-time data bus 21, where these support-point data sets 31 are used for controlling the drive units of the packaging machine 1.

The invention claimed is:

1. A method for producing packaging by means of a packaging machine (1) having a PLC control (20), said packaging machine (1) comprising several electronic drive units (3, 6), which are capable of being controlled independently of each other, are controlled by the PLC control (20) and drive functional elements (8) of the packaging machine (1) in a manner synchronous to a clock cycle when trailing predefined movement trajectories (33), and several setting parameters (27) of the production process, in particular the number of objects to be packaged per time unit, the packaging dimensions, the sealing times, having the following method steps:
   a) capturing setting parameters (27) at the PLC control (20) which controls the drive units (3, 6) of the packaging machine (1);
   b) transmitting the setting parameters (27) of the PLC control (20) to a PC control;
   c) calculating clock-cycle-dependent parameter profile curves (24, 25, 26) for the electronic drive units (3, 6) in the PC control (23), said parameter profile curves (24, 25, 26) enabling clock-cycle-synchronous control of the electronic drive units (3, 6) when trailing predefined movement trajectories (33) by factoring in the predefined setting parameters (27) of the production process and by factoring in static and dynamic threshold values of the packaging machine (1);
   d) separating the clock-cycle-dependent parameter profile curves (24, 25, 26) into a plurality of support points (30) in the PC control (23), each support point (30) including a clock-cycle point and at least one allocated parameter value;
   e) forming several support-point data sets (31) in the PC control (23), each support-point data set (31) containing at least a selection of the support points (30) and representing the clock-cycle-dependent parameter profile curves (24, 25, 26) in a discrete form;
   f) transferring the several support-point data sets (31) from the PC control (23) to the PLC control (20).

2. The method according to claim 1, wherein, when separating the clock-cycle-dependent parameter profile curves (24, 25, 26), a number in excess of 1,000 support points (30) is calculated, the number of the support points contained therein being reduced when generating the support-point data sets (31).

3. The method according to claim 1, wherein the clock-cycle-dependent parameter profile curves (24, 25, 26) are calculated as polynomial functions of a higher power in the PC control.

4. The method according to claim 1, wherein clock-cycle-dependent parameter profile curves (24, 25, 26) are calculated for the clock-cycle-dependent movement profiles or the clock-cycle-dependent speed profiles or the clock-cycle acceleration profiles and/or the clock-cycle-dependent power profiles or the clock-cycle-dependent torque profiles when controlling the drive units (3, 6).

5. The method according to claim 1, wherein the PC control (23) exchanges the setting parameters (27) to be input and the clock-cycle-dependent parameter profile curves (24, 25, 26) to be output using the PLC control via a real-time data bus (21).

6. The method according to claim 1, wherein for every change of a setting parameter (27) under consideration of static threshold values, at least one setting-specific dynamic threshold value is identified in the PC control (23) and is forwarded to the PLC control (20).

7. The method according to claim 6, wherein for identifying the dynamic threshold value, saved static threshold values or saved curve tables or saved mathematical functions are processed.

8. The method according to claim 6, wherein the dynamic threshold value is identified in the packaging machine (1) in a calculation method of the gradual approximation under consideration of at least one dynamic movement trajectory (33).

9. The method according to claim 1, wherein the clock-cycle-dependent parameter profile curves (24, 25, 26) are calculated in a calculation module of the PC control by using a calculation software.

10. The method according to claim 1, wherein the PLC control (20) controls the drive units of an enveloping material conveyor, or the drive units (3, 6) of at least one sealing jaw (8) or the drive units of a bag-cutting device, by using the support-point data sets (31).

\* \* \* \* \*